United States Patent [19]

Takanashi

[11] Patent Number: 5,619,790
[45] Date of Patent: Apr. 15, 1997

[54] METHOD AND APPARATUS FOR MAKING AN ELECTRICAL CONNECTION

[75] Inventor: Hitoshi Takanashi, Yokkaichi, Japan

[73] Assignee: Sumitomo Wiring Systems, Ltd., Japan

[21] Appl. No.: 445,424

[22] Filed: May 19, 1995

Related U.S. Application Data

[62] Division of Ser. No. 280,001, Jul. 25, 1994.

[30] Foreign Application Priority Data

Sep. 29, 1993 [JP] Japan ..................... 5-268334

[51] Int. Cl.$^6$ ............... H01R 43/00; H02G 1/12
[52] U.S. Cl. ............... 29/825; 29/857; 30/90.8; 81/9.51
[58] Field of Search ............ 29/825, 857, 861; 81/9.51; 30/90.8

[56] References Cited

U.S. PATENT DOCUMENTS 3,614,905  10/1971  Bieganski .
4,179,956  12/1979  Gooley ................................ 30/90.8 X
4,869,135   9/1989  Hoffa .................................... 81/9.51
4,942,789   7/1990  Hoffa .

*Primary Examiner*—Carl J. Arbes
*Attorney, Agent, or Firm*—Jordan B. Bierman; Bierman and Muserlian

[57] ABSTRACT

A cable connector combination wherein the cable has an electrically conductive core and an extra-thick insulating sheath. There is a terminal fitting which includes a wire barrel and an insulator barrel. The former grips the exposed length of bare wire core and the latter grips a reduced diameter portion of the sheath. The exposed length is formed by stripping the insulation completely from one end, and the reduced diameter portion of the sheath is formed by stripping part of the insulation from the cable, preferably at a point adjacent the exposed length. The reduced diameter is the same as the outer diameter of a normal sized cable and, therefore, bill fit easily and readily into the standard insulator barrel. Thus, no special fittings are required, and the abrasion-resistant cables can be handled along with all of the others. An apparatus for carrying out the method is also disclosed.

9 Claims, 4 Drawing Sheets

1

METHOD AND APPARATUS FOR MAKING AN ELECTRICAL CONNECTION

This application is a division of application No. 08/280,001 filed Jul. 25, 1994

This Application claims the priority of Japanese 268334/1993, filed Sep. 29, 1993.

The present invention is directed to an electric cable particularly designed for connection to a fitting, a method for the production of the cable, and an apparatus designed therefor.

BACKGROUND OF THE INVENTION

Electric cables, as used for example in automobiles, comprise an electrically conductive metallic core which is covered by insulation. These cables must be attached, usually in groups, to terminal fittings which are complementary thereto.

In order to do so, the insulation is stripped from one end of the cable to uncover the core wire. The standard fitting includes an insulator barrel, which grips an insulated part of the cable, and a wire barrel, which grips the exposed length of the wire. In this manner, the group of cables is fastened to the fitting.

However, certain cables are subjected to greater abrasion than others. As to these cables, they are made abrasion-resistant by increasing the thickness of the insulation. As a result, the cable is of substantially greater diameter than the normal cables.

In such a situation, the abrasion-resistant cable will not fit into the standard insulator barrel portion of the fitting. Heretofore, the solution to this problem has been to either enlarge the fitting or to provide an additional fitting which receives the abrasion resistant cable on one side and a standard sized cable on the other. Both of these solutions require special fittings and special handling for the abrasion resistant cable.

SUMMARY OF THE INVENTION

It is, therefore, among the objects of the present invention to provide a means whereby abrasion-resistant cables can be used with standard sized fittings, thereby avoiding the special handling which has heretofore been required. The invention is described herein with respect to abrasion-resistant cables, but it is understood that it is applicable to any enlarged diameter cable, regardless of the reason for the enlargement.

In the cable connector combination of the present invention, the abrasion-resistant cable includes the usual electrically conductive wire core surrounded by an extra-thick insulating sheath, along with a terminal fitting which includes a wire barrel and an insulator barrel. The former is adapted to grip the exposed length of bare wire core, while the latter grips a reduced diameter portion of the sheath. The exposed length of the cable is formed by stripping the insulation completely from one end, and the reduced diameter portion of the sheath is formed by stripping part of the insulation from the cable, preferably at a point adjacent the exposed length. The reduced diameter is the same as the outer diameter of a normal sized cable and, therefore, will fit easily and readily into the standard insulator barrel. Thus, no special fittings are required, and the abrasion-resistant cables can be handled along with all of the others.

The cable is preferably prepared by simultaneously removing part of the sheath to leave the desired reduced diameter and removing the sheath completely at the end in order to form the exposed length. Thus, in a single step, the abrasion resistant cable can be prepared for insertion into a standard fitting. Of course, the desired portions of the sheath may also be removed in separate operations.

To carry out the method of simultaneously removing the aforementioned portions of the sheath, a particular stripping device has been found especially useful. It includes a pair of clamping arms which are capable of moving between a closed position, wherein the faces of the arms press firmly against the outer surface of the sheath of the cable, and an open position, wherein the faces are out of contact with the sheath. These elements cooperate to hold the cable while stripping takes place. The active portion of the device is at least one pair of cutters which move toward and away from the axis of the cable. When in cutting position, the tips of both cutters penetrate the cable sheath, one extending to the periphery of the wire core, and the other terminating at a distance from the axis of the core which is substantially equal to one half the reduced diameter to be produced. In a preferred form of the device, there are two pairs of cutters, the second pair being substantially diametrically opposite the first pair.

The arms supporting the cutters are capable of rotational movement, bringing the cutters into and out of the cutting position, and sliding motion, moving the cutters parallel to the axis of the cable toward and away from the clamping arms. After cutting has taken place, movement of the cutters axially away from the clamping arms strips off the unwanted portions of the sheath, thereby leaving the cable having both the exposed length and the reduced diameter portion.

BRIEF DESCRIPTION OF THE DRAWINGS

In the accompanying drawings, constituting a part hereof, and in which like reference characters indicate like parts.

DETAILED DESCRIPTION OF THE INVENTION

Figure 1:
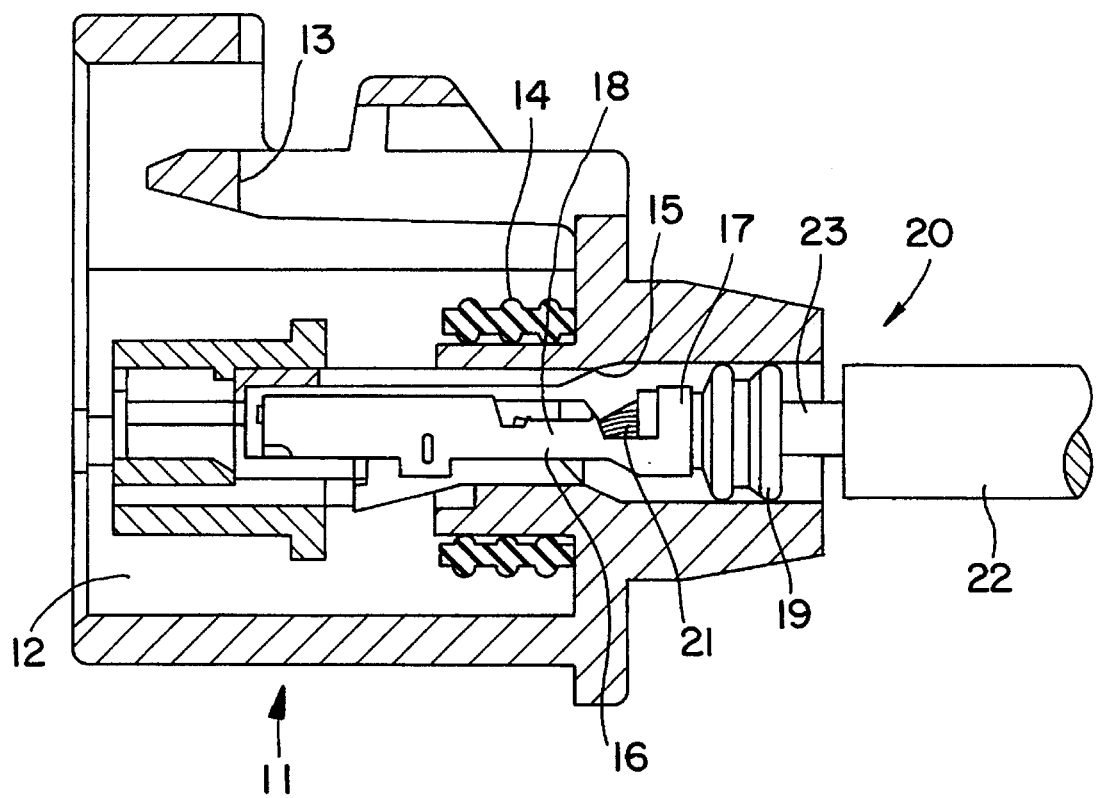
FIG. 1 is a sectional view of the cable connector combination of the present invention.

Referring more particularly to FIG. 1, the connector comprises housing 11, receptacle 12, into which another connecting member (not shown) can be inserted, lock 13, adapted to engage the other connector, waterproof seal 14, and cavity 15. Terminal fitting 16 is inserted into cavity 15. Terminal fitting 16 comprises insulation barrel 17, adapted to hold insulation covering 22 of cable 20, and wire barrel 18, which holds wire core 21. Insulator barrel 17 carries rubber seal 19 which is press fit into cavity 15, thereby rendering the connector watertight. The exposed length of wire core 21 is gripped by wire barrel 18 and reduced portion 23 is within standard insulator barrel 17 and is gripped thereby.

Figure 2A:
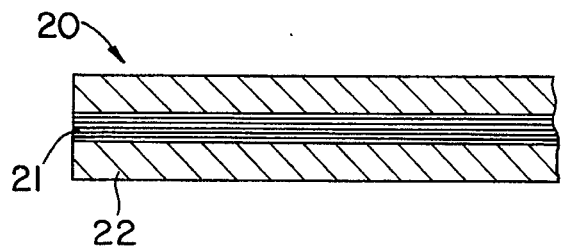
FIG. 2(a) is a sectional view of the cable used in the present invention before stripping.
Figure 2B:
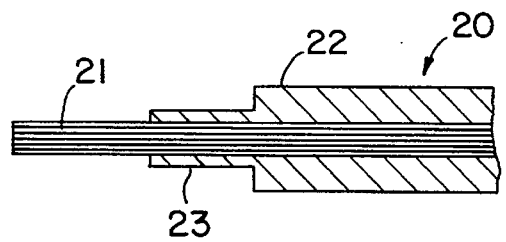
FIG. 2(b) is a view similar to that of FIG. 2(a) after the cable has been stripped.
Figure 3:
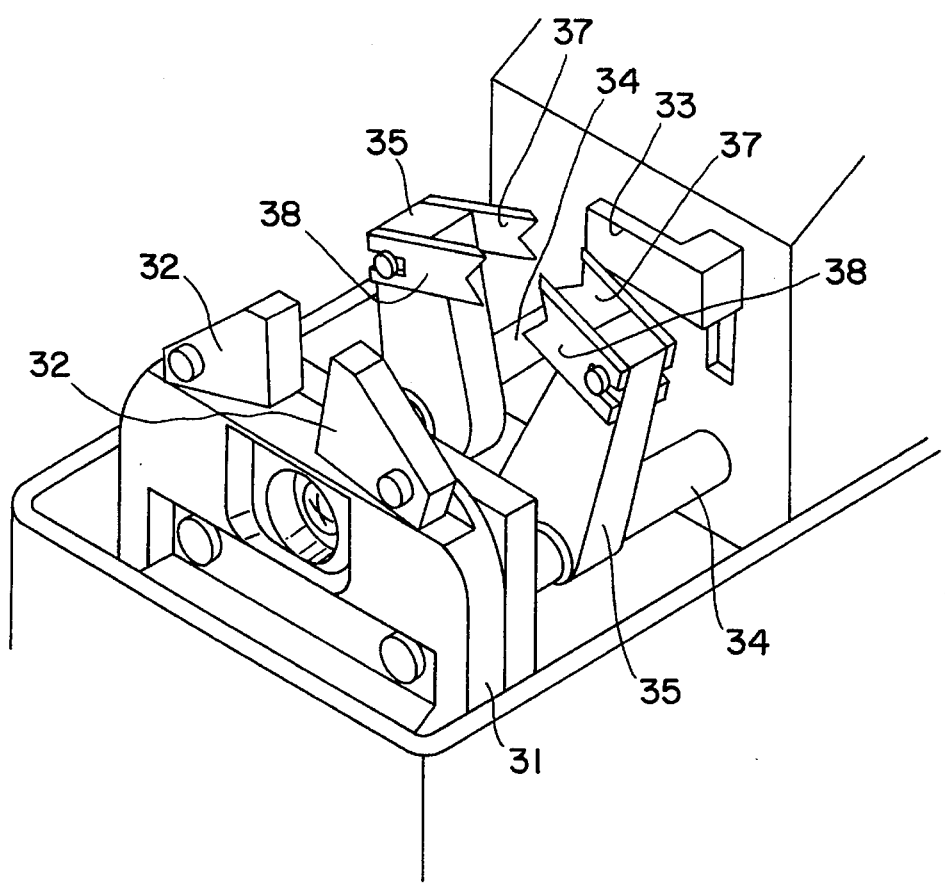
FIG. 3 is a perspective view of the stripping device of the present invention.

Referring more specifically to FIG. 2, cable 20 comprises electrically conductive wire core 21 covered by insulating sheath 22. Since cable 20 is intended to be abrasion resistant, insulating sheath 22 is thicker than normal and the overall diameter of cable 20 is, therefore, greater than normal. Cable 20, ready for insertion into terminal fitting 16, is shown in FIG. 2(b); after stripping, exposed length 21 and reduced portion 23 have been formed. The diameter of reduced portion 23 corresponds with that of a normal cable and insulator barrel 17.

Figure 4:
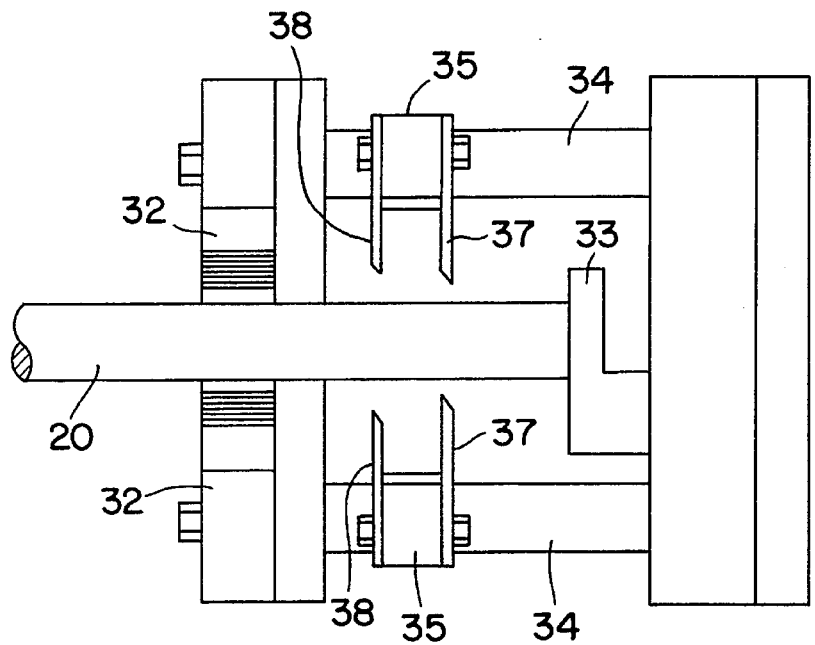
FIG. 4 is a plan view of a portion of the stripping device of FIG. 3 with the clamping axis out of contact with the sheath and the cutters in withdrawn or inoperative position.
Figure 5:
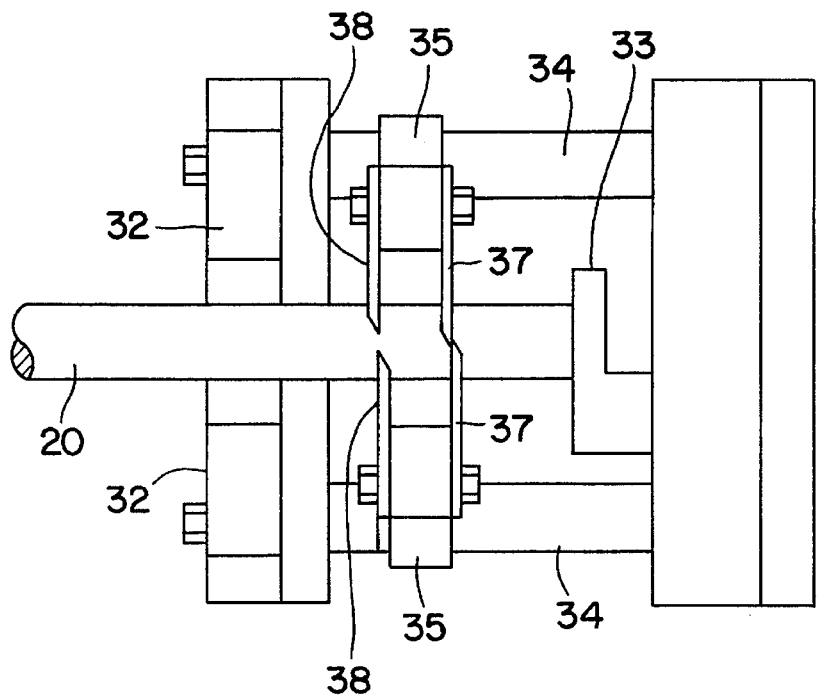
FIG. 5 is a view similar to that of FIG. 4 with the clamping arms and the cutters in operative position.
Figure 6:
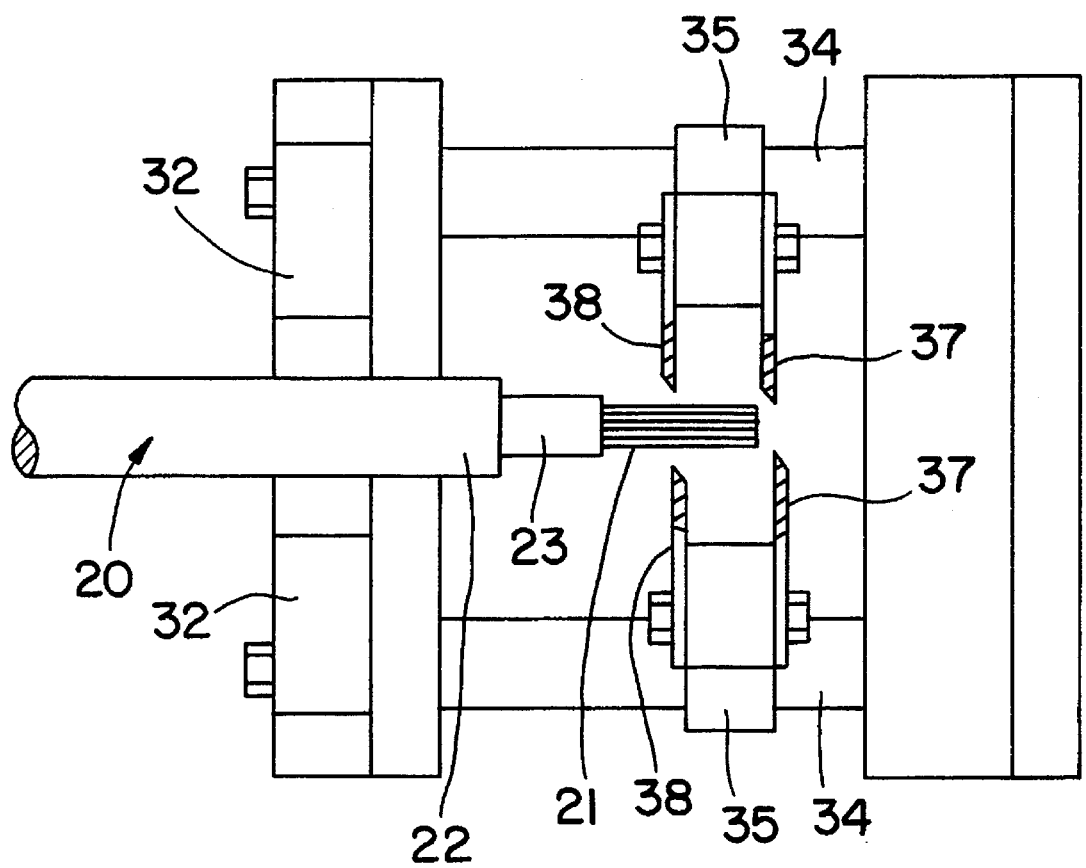
FIG. 6 is a view similar to that of FIG. 5 after the cable has been stripped.

A device for stripping insulating sheath 22 from cable 20 is shown in FIGS. 3 to 6. Frame 31 carries clamping arms 32, and stop 33 is provided in order to properly locate cable 20 in the device. Rotatable slide shafts 34 carry cutter support arms 35 on which cutters 37 and 38 are mounted. Referring more specifically to FIGS. 4 to 6, clamping arms 32 are in their open position (FIG. 4) and cable 20 has been inserted into the device and its end is located against stop 33. Clamping arms 32 are then moved into their closed position and grip cable 20 firmly. Shafts 34 are rotated so that cutters 37 and 38 penetrate sheath 22 of cable 20, as shown in FIG. 5. Shafts 34 then move away from clamping arms 32 in order to strip the undesired insulation from sheath 22 (see FIG. 6). Thereafter, clamping arms 32 are returned to their open position and cable 20 is removed from the device. The lengths of exposed length 24 and reduced portion 23 are predetermined so that they complement terminal fitting 16, insulator barrel 17, and wire barrel 18. Since the diameter of reduced portion 23 is the same as the outer diameter of a normal cable, it fits within insulator barrel 17 of standard size.

In operation, cable 20 is inserted into the stripping device until its leading end contacts stop 33. Clamping arms 32 are then pressed against cable 20 to fix it in position. Rotatable slide shafts 34 are moved away from stop 33 to the position shown in FIG. 4. At that point, shafts 34 rotate to cause cutters 37 and 38 to penetrate sheath 22 of cable 20. This position is shown in FIG. 5. Thereafter, shafts 34 move toward stop 33 (to the right as shown in FIGS. 4 to 6), thereby stripping sheath 22 and forming reduced portion 23 and exposed length 21, as shown in FIG. 6. Clamping arms 32 are then rotated out of contact with cable 20 which is then removed from the device.

Although only a limited number of specific embodiments of the invention have been expressly described, such changes and variations as would be apparent to the person of ordinary skill can be made without departing from the scope or spirit thereof. For example, it is not essential that a cutter be used to remove portions of the sheath, but rather the insulation can be melted by the use of supersonic vibrations. After cooling, any burrs remaining can be removed with a cutter or scraping device. These and other variations will suggest themselves to the person of ordinary skill; thus, the present invention is to be broadly construed and not to be limited except by the character of the claims appended hereto.

What I claim is:

1. A method of stripping an insulating sheath from a cable having an electrically conductive wire core which has a core diameter, said insulating sheath surrounding said core and having a sheath diameter, said method comprising simultaneously removing part of said sheath to leave a portion with a reduced diameter larger than said core diameter and smaller than said sheath diameter, and removing said sheath at an end of said cable to form an exposed length of said core, without rotation of said cable.

2. The method of claim 1 wherein said portion is adjacent said exposed length.

3. The method of claim 1 comprising inserting said cable into a stripping device, gripping said cable to secure it in place, cutting said insulating sheath to said wire core at a first predetermined point, simultaneously with cutting at said first point, cutting said sheath at a second predetermined point axially displaced from said first point in a direction away from a free end of said cable, simultaneously stripping off said sheath from said first point to said free end to form said exposed length and stripping off said sheath from said second point to form said portion.

4. The method of claim 3 wherein said portion is adjacent said exposed length.

5. The method of claim 3 wherein said cable is inserted so that said free end is in contact with a stop.

6. A device for stripping an insulating sheath from a cable having a free end, an electrically conductive wire core which has a core diameter, said insulating sheath surrounding said core and having a sheath diameter, to form a portion of said sheath with a reduced diameter which is larger than said core diameter and smaller than said sheath diameter, said device comprising at least one pair of cutters, movable in a cutting direction which is substantially perpendicular to an axis of said cable into a cutting position, wherein said cutters at least partially penetrate said sheath, and an open position, wherein said cutters are out of contact with said sheath, each of said cutters having a cutting tip nearer said cable, and a base end remote from said cable, a first of said cutters being of a length such that, when in said cutting position, said cutting tip penetrates said sheath to said wire core, a second of said cutters being of a length shorter than that of said first cutter so that, when in said cutting position, its said cutting tip is at a distance from said axis of said cable substantially equal to one half said reduced diameter, a pair of clamping arms, remote from said free end and adapted for movement between a free position, wherein said clamping arms are out of contact with said insulating sheath, and a clamped position, wherein said clamping arms grip said abrasion-resistant cable, whereby said cable is stripped by interaction between said cutters and said clamping arms.

7. The device of claim 6 wherein there are two first cutters and two second cutters.

8. The device of claim 7 wherein said first cutters are located diametrically opposite each other with respect to said cable and said second cutters are located diametrically opposite each other with respect to said cable.

9. The device of claim 6 wherein there is a stop in said device and remote from said clamp in a direction along said axis of said cable to position said cable before clamping by said clamping jaws.

* * * * *